United States Patent
Szigeti et al.

(10) Patent No.: US 12,526,288 B2
(45) Date of Patent: Jan. 13, 2026

(54) OPTIMIZING APPLICATION SECURITY BASED ON MALICIOUS USER INTENT

(71) Applicant: Cisco Technology, Inc., San Jose, CA (US)

(72) Inventors: Thomas Szigeti, Vancouver (CA); David J. Zacks, Vancouver (CA); Walter T. Hulick, Jr., Pearland, TX (US)

(73) Assignee: Cisco Technology, Inc., San Jose, CA (US)

( * ) Notice: Subject to any disclaimer, the term of this patent is extended or adjusted under 35 U.S.C. 154(b) by 317 days.

(21) Appl. No.: 17/489,359

(22) Filed: Sep. 29, 2021

(65) Prior Publication Data

US 2022/0417267 A1   Dec. 29, 2022

Related U.S. Application Data

(60) Provisional application No. 63/216,480, filed on Jun. 29, 2021.

(51) Int. Cl.
*H04L 9/40* (2022.01)

(52) U.S. Cl.
CPC ........ *H04L 63/1416* (2013.01); *H04L 63/108* (2013.01); *H04L 63/1425* (2013.01); *H04L 63/20* (2013.01)

(58) Field of Classification Search
CPC ............... H04L 63/1416; H04L 63/108; H04L 63/1425; H04L 63/20
See application file for complete search history.

(56) References Cited

U.S. PATENT DOCUMENTS

| | | | |
|---|---|---|---|
| 8,850,597 | B1 | 9/2014 | Gates et al. |
| 10,063,579 | B1 | 8/2018 | Machani |
| 2011/0023115 | A1 | 1/2011 | Wright |
| 2013/0091539 | A1 | 4/2013 | Khurana et al. |
| 2015/0007350 | A1* | 1/2015 | Gudipati ................. G06F 21/54 726/30 |
| 2017/0264628 | A1* | 9/2017 | Treat ....................... H04L 43/04 |
| 2019/0121972 | A1* | 4/2019 | Norvill ................. G06F 21/554 |
| 2019/0166152 | A1* | 5/2019 | Steele .................. H04L 63/1441 |
| 2019/0199744 | A1* | 6/2019 | Nides .................. H04L 63/1433 |
| 2020/0042699 | A1 | 2/2020 | Chari et al. |

(Continued)

OTHER PUBLICATIONS

Moore, et al., "A Pattern for Increased Monitoring for Intellectual Property Theft by Departing Insiders", ACM, PLoP 11: Proceedings of the 18th Conference on Pattern Languages of Programs, Article No. 19, Oct. 21, 2011, pp. 1-10.

(Continued)

*Primary Examiner* — Ellen Tran

(74) *Attorney, Agent, or Firm* — Lee & Hayes, P.C.

(57) ABSTRACT

An example method identifying a request to access or modify a data resource. The request is made by a user. The example method further includes authenticating the user. Based on authenticating the user, the example method includes determining that the request is associated with a malicious intent based on a characteristic of the user. Further, based on determining that the request is associated with the malicious intent, the example method includes blocking the user from accessing or modifying the data resource.

20 Claims, 8 Drawing Sheets

(56) References Cited

U.S. PATENT DOCUMENTS

2021/0084063 A1    3/2021    Triantafillos et al.
2021/0211443 A1*  7/2021    Sullivan .................. G06N 5/04

OTHER PUBLICATIONS

Legg, et al., "Automated Insider Threat Detection System Using User and Role-Based Profile Assessment", IEEE Systems Journal, IEEE, vol. 11, No. 2, Jun. 1, 2017, pp. 503-512.
PCT Search Report and Written Opinion mailed Sep. 27, 2022 for PCT Application No. PCT/US2022/034874, 17 pages.

* cited by examiner

OPTIMIZING APPLICATION SECURITY BASED ON MALICIOUS USER INTENT

CROSS-REFERENCE TO RELATED APPLICATIONS

This application claims the priority of U.S. Provisional App. No. 63/216,480, filed on Jun. 29, 2021, and which is incorporated by reference herein in its entirety.

TECHNICAL FIELD

The present disclosure relates generally to securing data resources from authorized users based on the intent of the users.

BACKGROUND

Organizations protect various important data and other computing resources using authentication systems. Authentication systems generally focus on verifying whether the user requesting access to a secured resource is indeed an authorized user. For example, an example system may use these techniques provide an employee with access to a secured resource and may deny a non-employee with access to the secured resource.

However, even authorized users pose serious security threats to organizations. For example, consider the case of an engineer working on a given product suddenly begins downloading a significant amount of confidential engineering documents and roadmaps for other products that they are not even affiliated with, and which may even be out of the domain of their role at the organization. Perhaps they are about to start a new job at a competitor and want to maximize the value that they can bring to their new role by gaining (soon to be) competitive insights and trade secrets. Another case may be a user exhaustively combing major parts of the company directory to share detailed contact information with unauthorized individuals, perhaps as sales leads. A third case may involve a people leader accessing salaries/ranges, market reference ranges or other confidential data for individuals or teams beyond their immediate span of authority to share with recruiters or other interested parties. A fourth case may be a single employee making large purchase orders to an otherwise unused supplier. Numerous other security risks are possible based on the behavior of authorized users.

A significant amount of security breaches are attributable to internal attacks. Many of these internal attacks are attributable to malicious intent by the authorized user. Accordingly, there is a need to identify authorized users with malicious intent and to block those users from accessing or manipulating secured resources.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
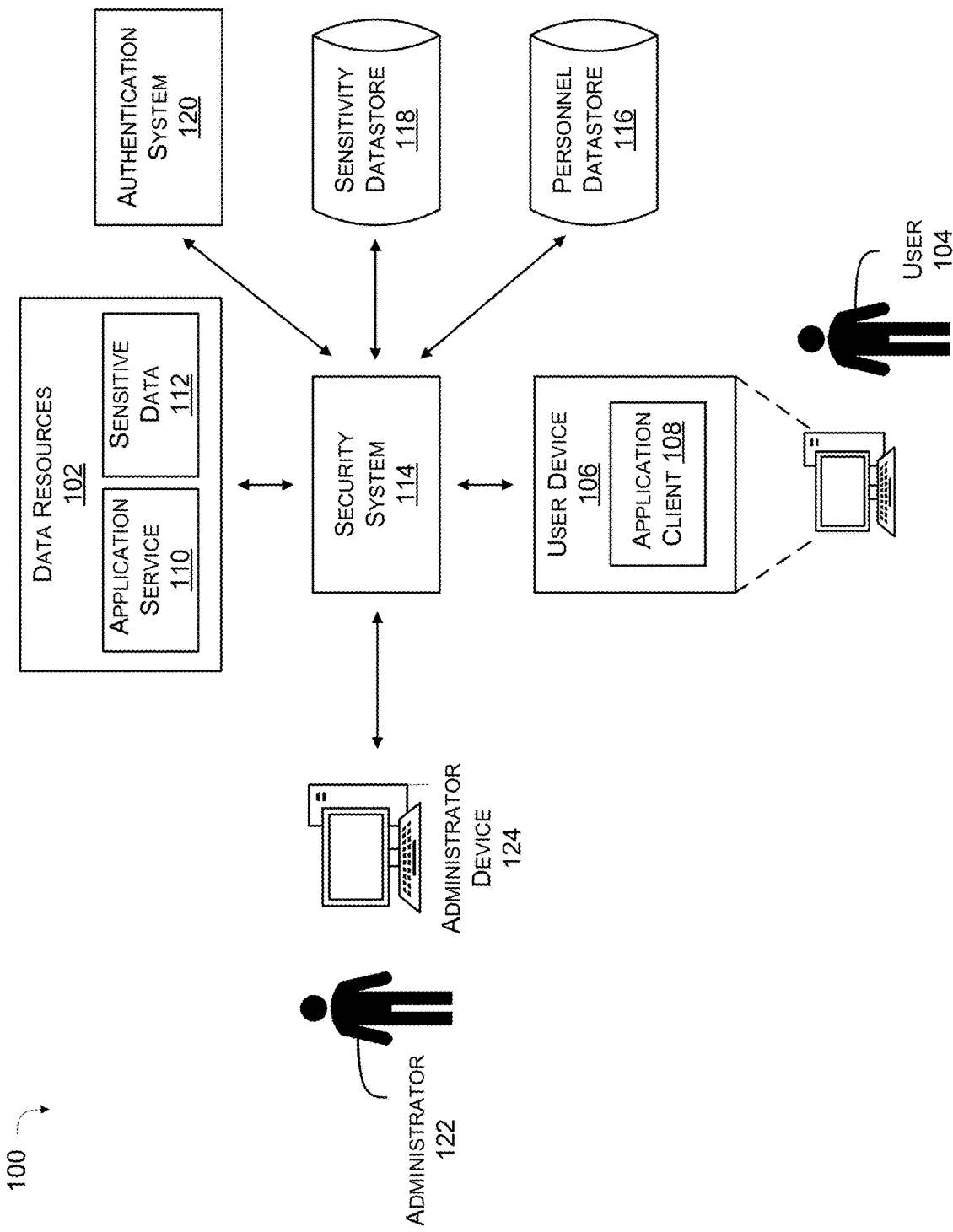
FIG. 1 illustrates an example environment for protecting data resources from malicious but authorized users.

This disclosure describes various implementations for optimizing security of data resources based on identifying malicious user intent. In particular cases, this disclosure outlines mechanisms to identify malicious intent evinced by authorized users within applications. These mechanisms can be enabled on an application (on perm or in the cloud) without computer code being added or reengineered or installing additional client software on end-user devices.

An example method includes identifying a request, made by a user, to access or modify a data resource; authenticating the user; based on authenticating the user, determining that the request is associated with a malicious intent based on a characteristic of the user; and based on determining that the request is associated with the malicious intent, blocking the user from accessing or modifying the data resource.

In some cases, authenticating the user includes: receiving, from a primary device associated with the user, at least one first authentication factor; receiving, from the primary device or a secondary device associated with the user, at least one second authentication factor; and determining that the at least one first authentication factor and the at least one second authentication factor match predetermined authentication factors associated with an authorized user.

According to some implementations, determining that the request is associated with the malicious intent includes: determining that the request is anomalous with respect to previous behavior of the user or with respect to behavior of other users sharing a role with the user, wherein the previous behavior of the user includes at least one of the user accessing a previous data resource, the user modifying the previous data resource, a web service call of an application utilized by the user, or a line of code of the application called during utilization by the user.

In some cases, the data resource is controlled by an organization. For instance, determining that the request is associated with the malicious intent may include determining that a date at which the user is departing the organization is within a threshold time period.

In various examples, determining that the request is associated with the malicious intent further includes: determining that the data resources include sensitive data, the sensitive data including at least one of confidential information or information with a high business value.

According to some instances, determining that the request is associated with the malicious intent further includes: determining that a previous transaction of the user triggered a runtime security event.

In some examples, the example method further includes: based on determining that the request is associated with the malicious intent: blocking the user from operating an application; or transmitting, to an administrator device, an alert indicating the user is attempting to modify or access the data resource.

Example Embodiments

Various implementations of the present disclosure will be described in detail with reference to the drawings, wherein like reference numerals present like parts and assemblies throughout the several views. Additionally, any samples set forth in this application are not intended to be limiting and merely demonstrate some of the many possible implementations.

Various implementations described herein address important concerns of insider threat management by providing application run time insights into harmful behavior by authorized users and enabling real-time policy enforcement to mitigate such events. Various implementations described herein go beyond traditional user and entity behavior analytics (REBA) and incorporates business logic, runtime application self-protection (RASP), as well as continuous multi-factor authentication (COMA), to identify when authorized internal users are doing or are about to do damage to the organization.

This technology proposes the use of a system to perform RASP analysis based on user behavior within an application. The system can be implemented by an existing client responsible for performing application performance analytics, such as AppDynamics™ from Cisco Systems of San Jose, Calif.. Application monitoring software, like AppDynamics™, can provide deep insights into users and their behavior within an application. Individual transactions that a user performs can discretely identified and monitored. Various implementations provide the use of an application performance monitoring (APM) system to monitor user behavior for security policy purposes.

The system takes in various inputs, such as the identity of a user utilizing an application, whether the user is authenticated, the user's previous behavior with the application, as well as what application data is sensitive, confidential, or has important business value. The system also notes different transactions that the user engages with the application, such as what data the user is accessing or modifying during the use of the application.

The system can generate a metric based on these inputs. In some cases, the metric involves anomaly detection, such as whether the behavior of the user is anomalous compared to previous user behavior (e.g., using user behavior analytics). The metric can also be generated based on whether the user is about to leave the organization (e.g., they provided their resignation from the organization), or whether the user has a history of bad behavior, which may be indicative of suspicious user behavior. The metric can take into account whether the user has been authenticated (e.g., through CMFA). In addition, the metric can also indicate whether the user has accessed or modified application data that is sensitive, confidential, or has high business value. By taking into account all of these factors, the system can infer user intent for the purpose of identifying malicious behavior.

If the system identifies malicious behavior, the system may take immediate actions to prevent damage to the application or the associated business. For example, the system may immediately block the user from operating the application, block the user from operating some aspects of the application, or may require the user to immediately reauthenticate prior to being allowed to continue to use the application. In some cases, the system may notify an administrator or other entity of the user's actions.

The techniques described herein go beyond generic UEBA and can include RASP analysis for specific suspicious events, application administrator inputs on sensitive transactions and/or confidential data, application runtime analysis for transaction amounts and continuous multi-factor authentication (MFA) analysis for user non-repudiation, etc. The combination of such diverse inputs analysis serves to derive a contextually rich picture of user intent so as to accurately identify malicious intent rather than simply unusual or inadvertent actions. For example, by considering inputs that go beyond merely determining whether a user's behavior is anomalous, various implementations described herein can distinguish between malicious requests and requests that are merely reflective of a user's unusual behavior, which can be the result of non-malicious factors (e.g., the user's changing role at the organization).

FIG. 1 illustrates an example environment 100 for protecting data resources 102 from malicious but authorized users. In various implementations, a user 104 utilizes a user device 106. In various cases, the user 104 is an employee of an organization, such as a business, government agency, or the like. The user 104 may specifically have a role within that organization. For example, the user 104 may be a marketing specialist, a programmer, a receptionist, an executive, or may have some other job within the organization. The organization, in some cases, may provide the user device 106 to the user 104 for organization-related tasks. The user device 106 may be a computing device, such as personal computer, a laptop computer, a tablet computer, a mobile device (e.g., a cell phone), an Internet of Things (IoT) device, a server, or the like. In various cases, the user device 106 includes at least one processor configured to perform operations. The user device 106 may further include member that stores instructions for performing the operations. The user 104 may input signals into the user device 106 via one or more input devices, such as a keyboard, a touchscreen, a microphone, or the like.

In various implementations, the user device 106 may connect to the data resources 102. These data resources 102 may be embodied in software, hardware, or a combination thereof. In some cases, the data resources 102 are remote from the user device 106. For example, the data resources 102 may be stored, operate on, or otherwise be embodied in one or more server computers that are separate from the user device 106.

In some examples, the user 104 utilizes a distributed application that includes an application client 108 and an application service 110. The application service 110 is an example of the data resources 102. The application client 108 may be executed by the user device 106. In various cases, the application service 110 is executed in one or more computing devices that are remote from the user device 106. For example, the application service 110 may be a virtual machine (VM) executed on one or more remote servers in at least one data center. During execution of the application, the user device 106 may execute code in the application client 108 and a remote computing device may execute code in the application service 110. Accordingly, the application may be distributed on both the user device 106 and the remote computing device.

In various instances, the user device 106 may further seek to access and/or modify sensitive data 112. The sensitive data 112 may include data stored in one or more remote computing devices, which may include one or more datastores. For example, the sensitive data 112 is stored in a database that is remote from the user device 106. As used herein, the term "sensitive data," and its equivalents, may refer to information that is confidential, secret, or otherwise nonpublic. Examples of sensitive data include trade secrets, state secrets, personally identifying information (e.g., social security numbers (SSNs), personal addresses, phone numbers, etc.), performance reviews of individuals within the organization, and confidential medical information. In various examples, exposure of the sensitive data to individuals outside of the organization may be particularly problematic. For example, if a trade secret is disclosed to individuals outside of the organization, the organization may lose a competitive business advantage in the marketplace.

In some examples, the sensitive data 112 includes high-value data. This high-value data may be of particular importance to the organization. For instance, the high-value data may have high business value. Examples of high-value data include nonpublic information about upcoming product releases, client lists and/or contact information, market analyses, financial disclosures, strategy and execution plans, organizational updates, potential acquisition targets for the organization, and so on.

Although many individuals within an organization can be trusted to utilize the data resources 102 without exposing them to outsiders, this is not always the case. In some implementations, the user 104 may seek to access the data resources 102 with a malicious intent. For example, even though the user 104 is a part of the organization, the user may 104 seek to expose the sensitive data 112 to outsiders or to use the application service 110 for a nefarious purpose.

To prevent the user 104 from accessing the data resources 102 with a malicious intent, the environment 100 may include a security system 114. The security system 114 may be configured to determine whether the user 104 is attempting to access the data resources 102 with a malicious intent. The security system 114 may also prevent the user 104 from accessing the data resources 104 if the user 104 has a malicious intent. Although the security system 114 is illustrated as being separate from the user device 106 and the data resources 102, implementations are not so limited. For example, the security system 114 may be at least partially executed by the user device 106 and/or the security system 114 may be at least partially executed by a remote computing device that hosts the data resources 102. In some cases, the security system 114 operates on a separate computing device that intercepts messages, requests, responses, and other signaling between the user device 106 and the data resources 102. According to some implementations, the security system 114 includes a firewall or other security mechanism that selectively blocks and/or passes messages between the user device 106 and other computing devices, such as one or more computing devices hosting the data resources 102.

In some implementations, the security system 114 may detect whether the user 104 has a malicious intent by determining whether a behavior of the user 104 and/or the user device 106 is anomalous. As used herein, the terms "behavior," "user behavior," and their equivalents, may refer to one or more transactions performed by a particular user. The term "transaction," and its equivalents, may refer to an event in which a user accesses data, modifies the data, saves the data, triggers execution of one or more lines of code in an application utilized by the user, triggers a web service call, triggers a security event, or the like. In various cases, the security system 114 may store indications of behavior of the user 104 over time. The security system 114, in some cases, may determine that the behavior is anomalous if at least one transaction in the behavior is anomalous with respect to other transactions in the behavior. In some implementations, the security system 114 determines whether the behavior of the user 104 is anomalous with respect to behavior of other individuals in the organization, such as individuals with the same or similar roles to the user 104. For instance, if the user 104 is a software engineer, the security system 114 may determine whether the behavior (e.g., one or more transactions including the access and/or modification of data) of the user 104 is anomalous with respect to the behavior of other software engineers within the organization. Examples of potentially anomalous behavior include the user 104 has at least attempted to access or modify data that the user 104 has not ordinarily accessed or modified, that the user 104 has at least attempted to store greater than a threshold amount of data from the data resources 102 to an external device (e.g., a USB stick), that the user 104 has attempted to move greater than a threshold amount of funds from an account of the organization to another account, or the like. Any of these thresholds may be determined based on previous behavior of the user 104 and/or based on the behavior of other individuals within the organization.

The security system 114 may use one or more anomaly detection techniques to determine whether the behavior of the user 104 is anomalous. In some implementations, the security system 114 executes one or more machine learning models to detect anomalies in the behavior of the user 104. Examples of anomaly detection techniques include comparing the behavior of the user 104 using a k-nearest neighbors model, an isolation forest, a hidden Markov model, a cluster analysis model, a Bayesian network, or any suitable anomaly detection technique known in the art. In some implementations, the security system 114 is within the distributed application, such that the security system 114 may detect and analyze the behavior f the user 104 within the application itself. For example, the security system 114 may be included in an APM system that is also configured to analyze the performance of the application based on user behavior.

In various cases, the security system 114 may determine whether the user 104 has a malicious intent based on their employment status and/or impending changes to their employment status. If the user 104 is known to be leaving the organization in the future, the user 104 may be more likely to access the data resources 102 with malicious intent. The employment status of the user 104 may be stored in a personnel datastore 116. The security system 114 may access the personnel datastore 116 in order to determine the employment status of the user 104. The personnel datastore 116, in some cases, stores at least one entry corresponding to the user 104. For example, the personnel datastore 116 may store a departure date of the user 104, an indication of whether the user 104 is departing the organization willingly (e.g., an indication of whether the user 104 has been fired, whether the user 104 has been laid off, whether the user 104 has voluntarily resigned from the organization, etc.), and the like. The security system 114 may determine that the user 104 is behaving maliciously if the user 104 is departing the organization (e.g., willingly and/or unwillingly) and/or if the user 104 is departing the organization within a threshold time period (e.g., 1 day, 2 days, 3 days, etc.).

In various cases, the personnel datastore 116 can be updated by a human resource (HR) system. The HR system may be implemented using an application programming interface (API). For instance, an HR system may indicate that a user has given their two-weeks' notice or is about to be fired, which may be associated with an increased chance that the user will participate in suspicious and/or malicious behavior.

According to some examples, the security system 114 may determine whether the user 104 has a malicious intent based on whether the user 104 has triggered one or more security events. As used herein, the term "security event," and its equivalents, may refer to any instance of blocking and/or flagging suspicious behavior within a computing network environment. For example, a security event may include a firewall (e.g., a firewall within the security system 114) blocking data traffic to or from the user device 106. The security event itself may be independent of the data resources 102. In some cases, the security system may infer that the user has a malicious intent by determining that the user 104 has triggered greater than a threshold number of security events.

In some examples, the security system 114 may determine whether the user 104 has a malicious intent based on the type of the data resources 102 that the user 104 intends to access. A sensitivity datastore 118 may store indications of sensitivity of the various data resources 102 that can be accessed. For instance, the sensitivity datastore 118 may indicate that publicly available information stored in the data resources 102 has a relatively low sensitivity, whereas confidential trade secrets stored in the data resources 102 have a relatively high sensitivity. The sensitivity of the data resources 102 sought by the user 104 may be positively correlated to the likelihood that the user 104 has a malicious intent.

In various cases, the security system 114 calculates a metric indicative of the likelihood that the user 104 has a malicious intent. The metric, for example, may be represented as a percentage or some other number. In various cases, the security system 114 increases or decreases the metric based on whether the behavior of the user 104 is anomalous, the employment status of the user 104, whether the user 104 has triggered one or more security events, the sensitivity of data sought by the user 104, or a combination thereof. The security system 114 may conclude that the user 104 has a malicious intent by comparing the metric to a threshold. For instance, the security system 114 may infer that the user 104 has a malicious intent by determining that the metric is greater than a particular threshold. This threshold, for example, may be manually set by a security engineer within the organization and/or may be adaptively set using machine learning.

According to various implementations, the security system 114 may confirm the identity of the user 104. For example, an authentication system 120 may authenticate the user 104 and/or the user device 106 and may provide an indication of whether the user 104 and/or the user device 106 has been authenticated to the security system 114. By authenticating the user 104, the user 104 may be prevented from later denying culpability in attempting to access the data resources 102 with malicious intent by asserting that the user device 106 has been stolen by some other nefarious actor.

In some cases, the authentication system 120 performs multi-factor authentication (MFA) on the user 104 and/or the user device 106. As used herein, the terms "multi-factor authentication," "MFA," and their equivalents, can refer to a process of confirming that a device, the identity of a user of the device, or both, are authorized by requesting and receiving at least two authentication factors from the device, the user, and/or one or more additional devices associated with the user. A user or device is "authorized" when they have permission to access a secure resource. When compared to single-factor authentication, MFA is more likely to successfully authenticate an authorized user or device and to successfully deny an unauthorized user or device. An example MFA process includes requesting a first authentication factor; based on receiving the first authentication factor, requesting a second authentication factor; and based on receiving the second authentication factor, enabling access to a protected resource (e.g., the data resources 102). The first authentication factor and/or the second authentication factor can be received from a single device or multiple devices associated with the same user.

Authentication factors, in some cases, include codes that are known to an authorized user. As used herein, the term "code," and its equivalents, can refer to a predetermined combination of alphanumeric characters and/or pixels. A password is an example of a code that can be used as an authentication factor. Other examples of codes include usernames, personal identification numbers (PINs), employee numbers, social security numbers (SSNs), driver's license numbers, Quick Response (QR) codes, and the like.

Examples of authentication factors include evidence of possession of an object associated with an authorized user. In some examples, the object may be another device associated with the authorized user. An authentication factor may be evidence that the user 104 is attempting to use a primary device, such as the user device 106, is also in possession and control of a secondary device associated with the primary device. For instance, the authentication system 120 may transmit a push notification to secondary device that is associated with the user 104 and may confirm that the user device 106 is being used by an authorized individual by confirming receipt of the push notification (e.g., by entering a code specified in the push notification into the user device 106 or selecting a button associated with the push notification on the secondary device). In some implementations, authentication factors may include evidence of possession of a card, a physical key, a Universal Serial Bus (USB) drive, or the like. For example, the user device 106 may include a scanner that is configured to scan a code or chip integrated into the card, key, or USB stick.

Certain authentication factors include evidence that a device is in a particular location associated with an authorized user. For example, an authentication factor may be evidence that the user device 106 is located in a building associated with a home or workplace of the authorized user 104. In some cases, the user device 106 self-reports its location to the security system 114. For example, the primary device may receive signals from multiple satellites (e.g., Global Positioning System (GPS) satellites) and determine the location of user device 106 based on the signals. In some examples, the authentication system 120 receives a signal indicative of the location of the user device 106. For example, the signal may indicate that the user device 106 is connected to an AP (e.g., a Wi-Fi AP) or a Radio Access Network (RAN) associated with a particular coverage area, which may indicate that the user device 106 is located in the coverage area.

Some authentication factors include evidence of the presence of an authorized user. In some implementations, authentication factors may be biometric factors. As used herein, the term "biometric factor," and its equivalents, can refer to evidence of the presence of a body associated with an authorized user. For example, a biometric factor may refer to data indicative of the authorized user speaking (e.g., an audible password), data indicative of a fingerprint of the authorized user (e.g., a fingerprint scan), data indicative of an eye of the authorized user (e.g., an iris or retina scan), data indicative of a face of the user (e.g., a facial scan), and so on. The authentication system 120 may recognize a biometric factor by performing techniques such as voice recognition, fingerprint recognition, facial recognition, and the like.

In some implementations, the authentication system 120 performs continuous MFA (CMFA) on the user 104 and/or the user device 106. In a CMFA scheme, multiple authentication factors are received from a user or device in a continuous or semi-continuous manner. For example, the authentication system 120 may automatically receive each type of authentication factor periodically (e.g., once every second, once every minute, etc.) and/or repeatedly. The authentication system 120 may generate a score based on the received authentication factors and may adjust the score over time based on the quality of the authentication factors received and/or the time since the authentication factors have been received. For instance, the authentication system 120 may be less sure that the user 104 is authorized if the last time an authentication factor was received was a relatively long time ago, but may be more sure that the user 104 is authorized if the last time the authentication factor was received was a relatively short time ago. The score may reflect the confidence by the authentication system 120 that the user 104 is authorized.

In some cases, the user device 106 calculates the CMFA score of the user 104 and transmits the CMFA score to the authentication system 120. In particular implementations, the authentication system 120 itself calculates the CMFA score of the user 104 based, at least in part, on data transmitted from the user device 106 indicating one or more authentication factors of the user 104.

The authentication system 120 may authenticate the user 104 and/or user device 106. In various cases, the authentication system 120 may confirm multiple authentication factors received from the user 104 and/or the user device 106. The security system 114 may compare the CMFA score of the user 104 and/or the user device 106 to one or more thresholds. For instance, the authentication system 120 may determine that the user 104 is authorized by determining that the CMFA score of the user 104 is greater than a first threshold or is less than a second threshold.

Upon determining that the user 104 has a malicious intent and/or that the user 104 or user device 106 is authorized, the security system 114 may perform one or more protective actions. In some implementations, the security system 114 may prevent the user device 106 from connecting to the data resources 102. For example, the security system 114 may prevent the user 104 from utilizing the application by disconnecting the application service 110 from the application client 108. In some cases, the security system 114 may prevent the sensitive data 112 from being retrieved, modified, stored, or otherwise accessed by the user device 106. In some cases, the security system 114 may act as a firewall and prevent data from being transferred between the data resources 102 and the user device 106.

According to some cases, the security system 114 may cause the authentication system 120 to authenticate the user 104 and/or the user device 106 upon detecting the malicious intent. If the user 104 and/or the user device 106 has not yet been authenticated, or has not been recently authenticated, this step can ensure that the user device 106 is not controlled by some other nefarious actor.

In some examples, the security system 114 may notify an administrator 122 that the user 104 has a malicious intent. The administrator 122 may be a trusted individual within the organization, such as a human resources professional or security engineer. Upon identifying the malicious intent of the user 104, the security system 114 may generate an alert indicating the attempted access of the data resources 102 by the user 104. For instance, the alert may identify the user 104, indicate a time of the attempted access, indicate that the data resources 102 were not accessed by the user 104, an employment status of the user 104, a sensitivity of the data requested by the user 104, whether the user 104 was authenticated, or a combination thereof. The security system 114 may transmit the alert to an administrator device 124 associated with the administrator 122. The administrator device 124 may be a computing device, such as personal computer, a laptop computer, a tablet computer, a mobile device (e.g., a cell phone), an IoT device, a server, or the like. The administrator device 124 may further include member that stores instructions for performing the operations. The administrator 122 may sense signals output by the administrator device 124 via one or more output devices, such as a display screen, a speaker, or the like. In various cases, the administrator device 124 may output the alert to the administrator 122. According to some examples, the administrator 122 may store indications of the employment status of various individuals in the organization in the personnel datastore 116 and/or may store indications of the sensitivity of the data resources 102 in the sensitivity datastore 118, using the administrator device 124.

Although not specifically illustrated in FIG. 1, any of the components illustrated in FIG. 1 may be implemented in hardware, software, or a combination thereof. Moreover, any of the components illustrated in FIG. 1 may be communicatively coupled to one another via one or more communication networks. The communication network(s) may include wired (e.g., optical, Ethernet, etc.) networks, wireless (e.g., WI-FI, BLUETOOTH, Long Term Evolution (LTE), New Radio (NR)) networks, or any combination thereof. In some implementations, the communication network(s) include one or more local area networks (LANs), one or more wide area networks (WANs) (e.g., the Internet), or any combination thereof. Various signaling described herein can be implemented by the transmission of one or more data packets across the communication network(s).

A particular example will now be described with respect to FIG. 1. In this example, the user 104 may be a software engineer for the organization, which may be a corporation. The user 104 may have submitted their resignation to the organization, thereby providing the organization with two-week notice that the user 104 will be leaving the organization. Although the user 104 remains employed at the organization during the two weeks prior to their departure, the user 104 knows that they are planning to start their own company after departing the organization.

In the interest of their new company, the user attempts to download confidential trade secrets relating to software developed by individuals within the organization. For instance, the user 104 directs the user device 106 to transmit a request for the sensitive data 112. The request is intercepted by the security system 114. In various cases, the security system 114 may cause the authentication system 120 to authenticate the user 104, or may request an indication of whether the user 104 is authenticated from the authentication system 120. Because the user 104 is a legitimate member of the organization at the time of the request, with a software engineer role that would ordinarily enable the user 104 to access the software developed by individuals within the organization, the authentication system 120 may indicate that the user 104 is authenticated to the security system 114.

However, the security system 114 may nevertheless infer that the user 104 is attempting to obtain the software in the sensitive data 112 with malicious intent. The security system 114 may determine that the behavior of the user 104 is anomalous. For example, it may be anomalous for software developers to request to download the software in the sensitive data 112. In some cases, other behavior of the user 104 may be deemed anomalous. For example, the user 104 may use the application embodied in the application client 108 and application service 110 to start searching for opportunities to enroll in business incubators or other start-up organizations, which may be unusual based on previous behavior of the user 104 or the behavior of other individuals within the organization.

The security system 114, in some cases, may use techniques other than anomaly detection to identify the malicious intent of the user 104. For example, the security system 114 may access the personnel datastore 116 in order to determine that the user 104 has resigned and/or is leaving the organization within two weeks. In some instances, the security system 114 may access the sensitivity datastore 118 in order to identify that the software requested by the user 104 is confidential.

Based on identifying the malicious intent of the user 104, the security system 114 may trigger one or more protective actions. In particular cases, the security system 114 may prevent the user device 106 from downloading the software in the sensitive data 112. In some implementations, the security system 114 may prevent the user device 106 from accessing any of the data resources 102. Accordingly, the software and other important data may be protected from the user 104. In addition, the security system 114 may transmit an alert to the administrator device 124. The alert may identify the user 104 (e.g., by name, by employee identification number, by role, etc.), the user device 106 (e.g., by serial number, etc.), the software requested by the user 104, or a combination thereof. Accordingly, the administrator 122 may take efforts to revoke permissions for the user 104 to access other data resources 102 of the organization, to escort the user 104 from the premises of the organization, to repossess the user device 106 from the user 104, or the like.

Figure 2:
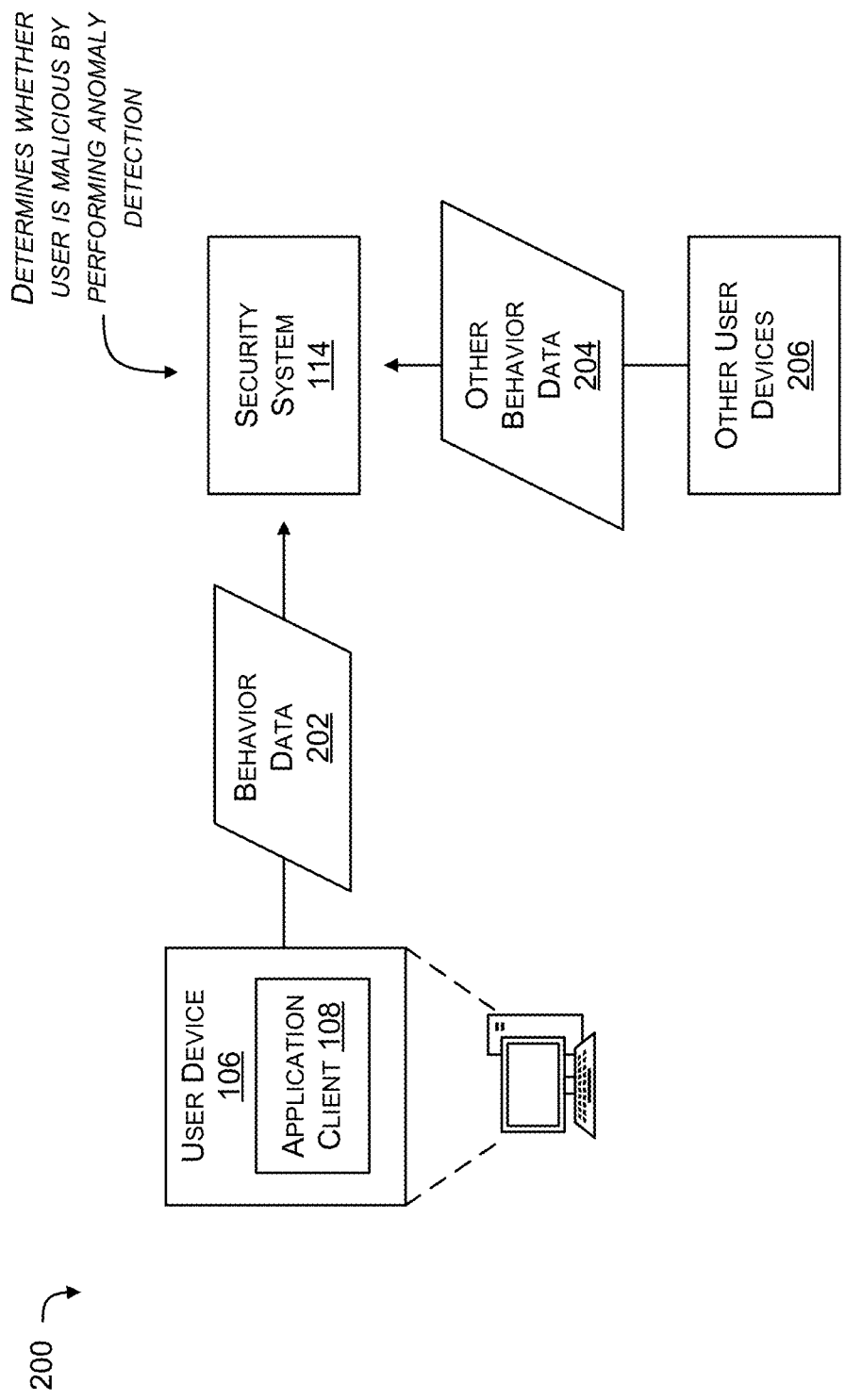
FIG. 2 illustrates example signaling for detecting anomalies in a user's behavior.

FIG. 2 illustrates example signaling 200 for detecting anomalies in a user's behavior. As shown, the signaling 200 is between the user device 106 and the security system 114 described above with reference to FIG. 1. The user device 106 operates the application client 108 described above with reference to FIG. 1.

In various implementations, a user utilizes the user device 106 to perform various behavior. The behavior may include one or more transactions performed by the user device 106. Examples of transactions include accessing data, storing data, modifying data, using an application, accessing a network, and so on. In some cases, the behavior is specifically within the application including the application client 108. For example, the behavior may include causing the application client 108 (or a corresponding application service) to execute one or more lines of code in the application. In some cases, the behavior may include a security event triggered by the user device 106. For example, the behavior may include an attempt by the user device 106 to reach a web server that is blocked by a firewall of the organization, or an attempt by a web server to transmit data to the user device 106 that is blocked by the firewall.

The user device 106 may provide behavior data 202 to the security system 114. The behavior data 202 may indicate the behavior of the user. For instance, the behavior data 202 may indicate one or more transactions of the user in a particular time period, such as the last day, the last week, the last month, or the last year. In some implementations, the application client 108 provides the behavior data 202 to the security system 114.

The security system 114 may also receive other behavior data 204 from other user devices 206. In some implementations, the other user devices 206 may be associated with the same organization as the user device 106. The other behavior data 204 may indicate the behavior of other individuals within the organization. In some cases, the other user devices 206 are associated with individuals that have the same or similar roles as the user of the user device 106. For example, if the user is a software engineer, the other behavior data 204 may indicate the behavior data of other software engineers within the organization.

In various implementations, the security system 114 may perform anomaly detection to determine whether the behavior of the user utilizing the user device 106 is anomalous. In some cases, the security system 114 compares recent behavior of the user to previous behavior of the user utilizing the user device 106, as indicated in the behavior data 202. In some implementations, the security system 114 compares the behavior of the user utilizing the user device 106, as indicated in the behavior data 202, to the behavior of other individuals utilizing the other user devices 206, as indicated in the other behavior data 204.

The security system 114 may utilize one or more anomaly detection techniques to determine whether the behavior of the user utilizing the user device 106 is anomalous. For example, the security system 114 determines that the behavior of the user is anomalous using a k-nearest neighbors model, an isolation forest, a hidden Markov model, a cluster analysis model, a Bayesian network, or any suitable anomaly detection technique known in the art. In some implementations, the security system 114 determines that the request of the user is anomalous with respect to previous behavior of the user, as indicated in the behavior data 202. In some cases, the security system 114 determines that the request of the user is anomalous with respect to previous behavior by other users, as indicated in the other behavior data 204. In various instances, the security system 114 may infer that the user has malicious intent by determining that the behavior of the user is anomalous.

Figure 3:
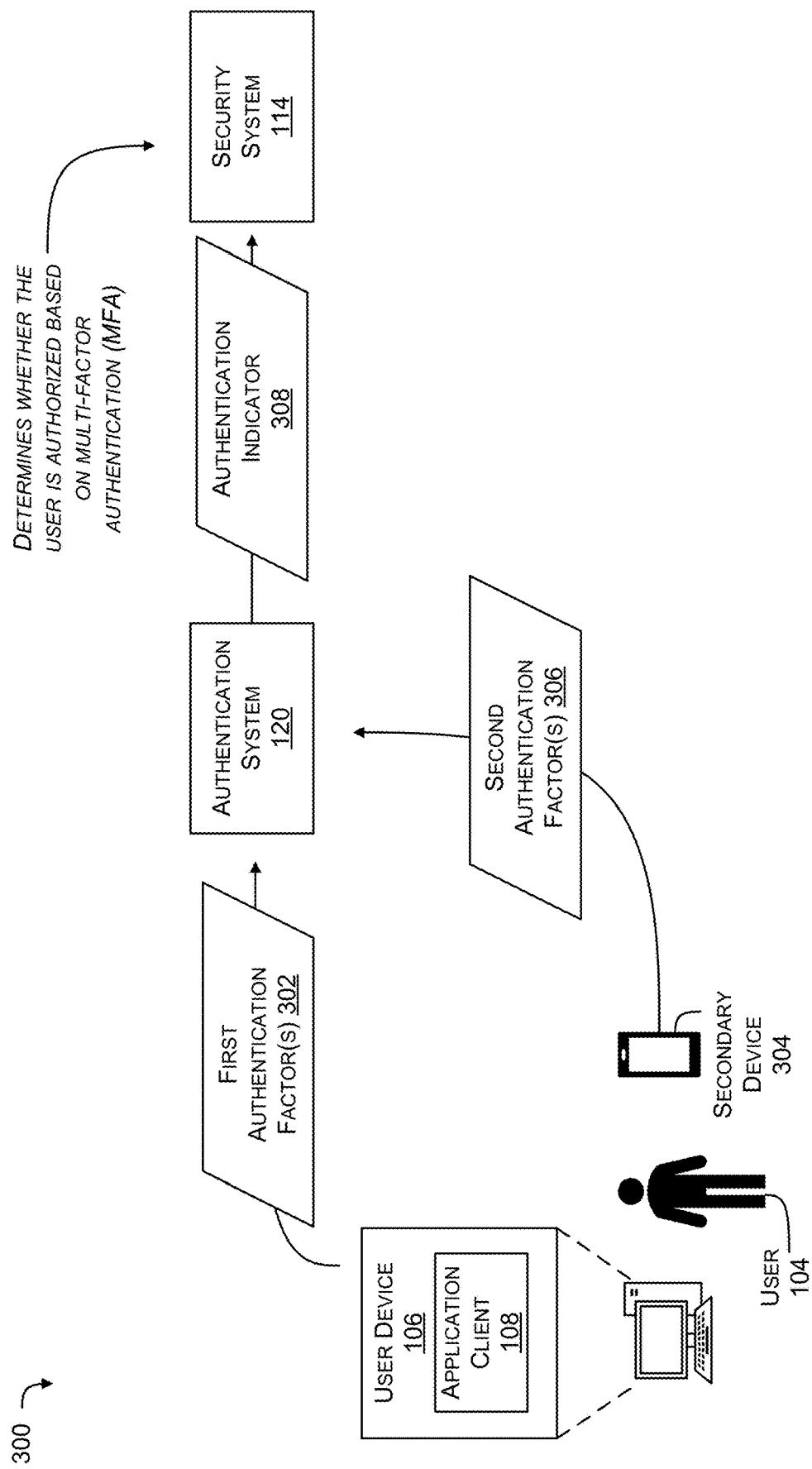
FIG. 3 illustrates example signaling for user authentication.

FIG. 3 illustrates example signaling 300 for user authentication. As illustrated, the signaling 300 is between the user device 106, the security system 114, and the authentication system 120 described above with reference to FIG. 1. The user device 106 operates the application client 108 described above with reference to FIG. 1.

In various implementations, the user device 106 may transmit one or more first authentication factors 302 to the authentication system 120. For example, the application client 108 may provide the first authentication factor(s) 302 to the authentication system 120. Although not illustrated in FIG. 3, in some cases, the authentication system 120 requests the first authentication factor(s) 302 from the user device 106. The first authentication factor(s) 302, in some cases, may be transmitted repeatedly and/or periodically by the user device 106.

In addition, a secondary device 304 may transmit one or more second authentication factors 306 to the authentication system 120. The secondary device 304 may be associated with the user 104, such as a personal cell phone or some other computing device utilized by the user 104 and pre-registered with the authentication system 120. Although not illustrated in FIG. 3, in some cases, the authentication system 120 requests the second authentication factor(s) 306 from the user device 106. The second authentication factor (s) 306 may, in some implementations, be transmitted repeatedly and/or periodically by the secondary device 304.

In various implementations, the authentication system 120 may authenticate the user 104 and/or the user device 106 based on the first authentication factor(s) 302 and/or the second authentication factor(s) 306. In particular cases, the authentication system 120 performs MFA on the user 104 and/or the user device 106. For example, the authentication system 120 may perform CMFA to confirm the identity of the user 104 and/or user device 106.

The authentication system 120 may provide an authentication indicator 308 to the security system 114. The authentication indicator 308 may indicate whether the user 104 and/or the user device 106 is authenticated. The security system 114 may use the authentication indicator 308 to confirm the identity of the user 104 and/or the user device 106.

Figure 4:
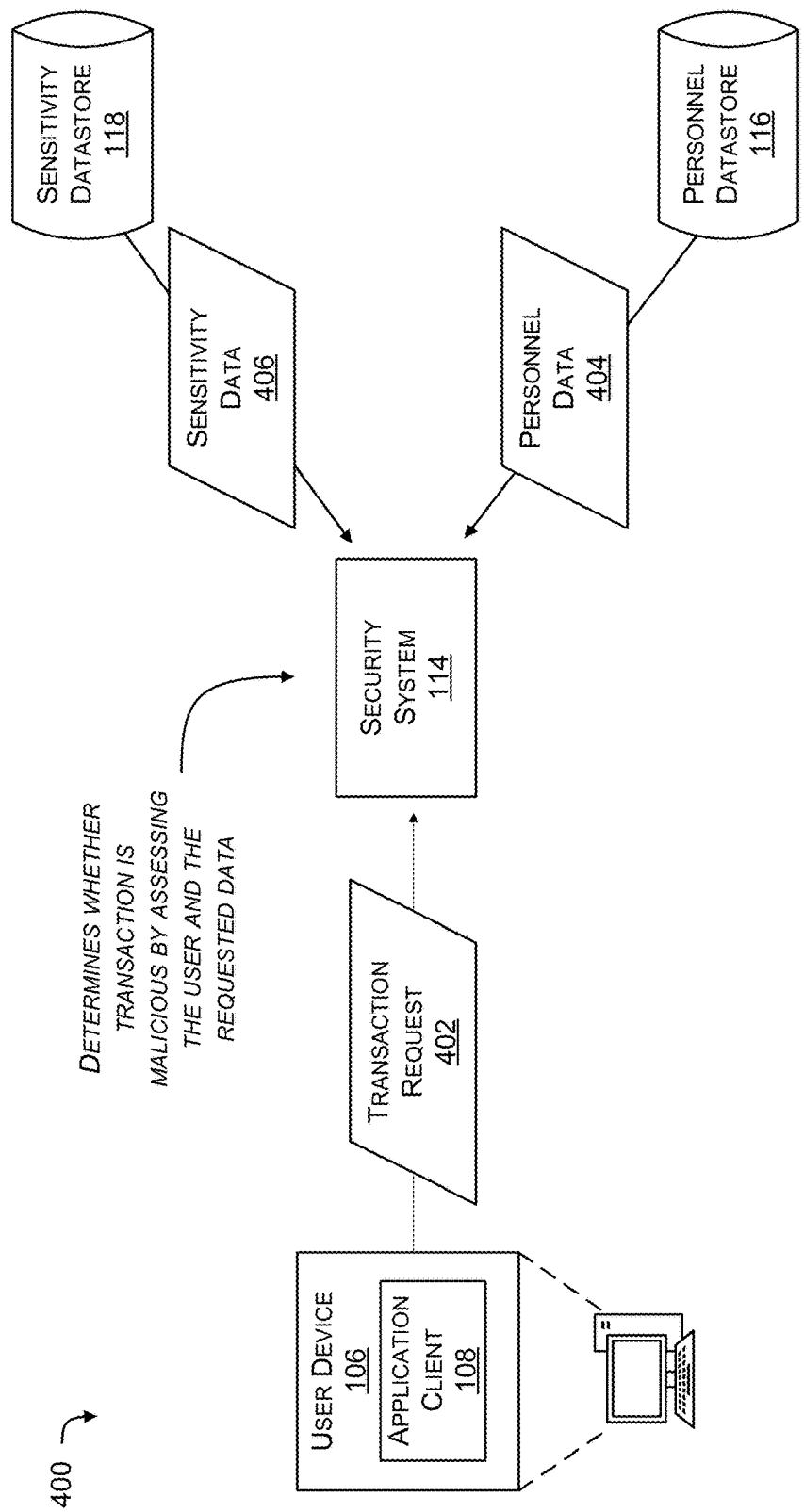
FIG. 4 illustrates example signaling for inferring malicious intent based on a type of data being requested and/or characteristics of the requester.

FIG. 4 illustrates example signaling 400 for inferring malicious intent based on a type of data being requested and/or characteristics of the requester. As shown, the signaling 400 is between the user device 106, the security system 114, the personnel datastore 116, and the sensitivity datastore 118 described above with respect to FIG. 1. The user device 106 operates the application client 108 described above with reference to FIG. 1.

In various implementations, the user device 106 may transmit a transaction request 402. The transaction request 402 may indicate a requested data resource. In some implementations, the transaction request 402 is provided from the application client 106 toward a remote application service (not illustrated in FIG. 4).

The security system 114 may intercept or otherwise receive the transaction request 402. In response to receiving the transaction request 402, the security system 114 may receive personnel data 404 from the personnel datastore 116 and/or sensitivity data 406 from the sensitivity datastore 118. In some examples, the security system 114 requests the personnel data 404 from a device that includes the personnel datastore 116 and/or requests the sensitivity data 404 from a device that includes the sensitivity datastore 118. In some cases, the security system 114 accesses the personnel data 404 and/or the sensitivity data 406 from the personnel datastore 116 and/or the sensitivity datastore 118.

The security system 114 may determine whether the transaction request 402 is associated with a malicious intent by evaluating the personnel data 404. In various cases, the transaction request 402 may indicate a user requesting data. The personnel data 404 may indicate an employment status of that user. For example, the personnel data 404 may indicate that the user has resigned, has been fired, or has been laid off from the organization. In some cases, the personnel data 404 indicates a departure date at which the user is leaving the organization and/or a time until the departure of the user from the organization. The security system 114 may infer that the transaction request 402 is associated with malicious intent by determining that the user is leaving the organization and/or that the user is leaving the organization within a particular time period (e.g., one day, five days, one week, two weeks, etc.).

In some implementations, the security system 114 may determine whether the transaction request 402 is associated with a malicious intent by evaluating the sensitivity data 406. The sensitivity data 406 may indicate a sensitivity of the data requested by the transaction request 402. In various cases, the sensitivity of the requested data may depend on whether the data is confidential and/or the value (e.g., business value) of the requested data to the organization. If the requested data is sensitive data, or has greater than a threshold sensitivity, the security system 114 may infer that the transaction request 402 is associated with malicious intent.

Figure 5:
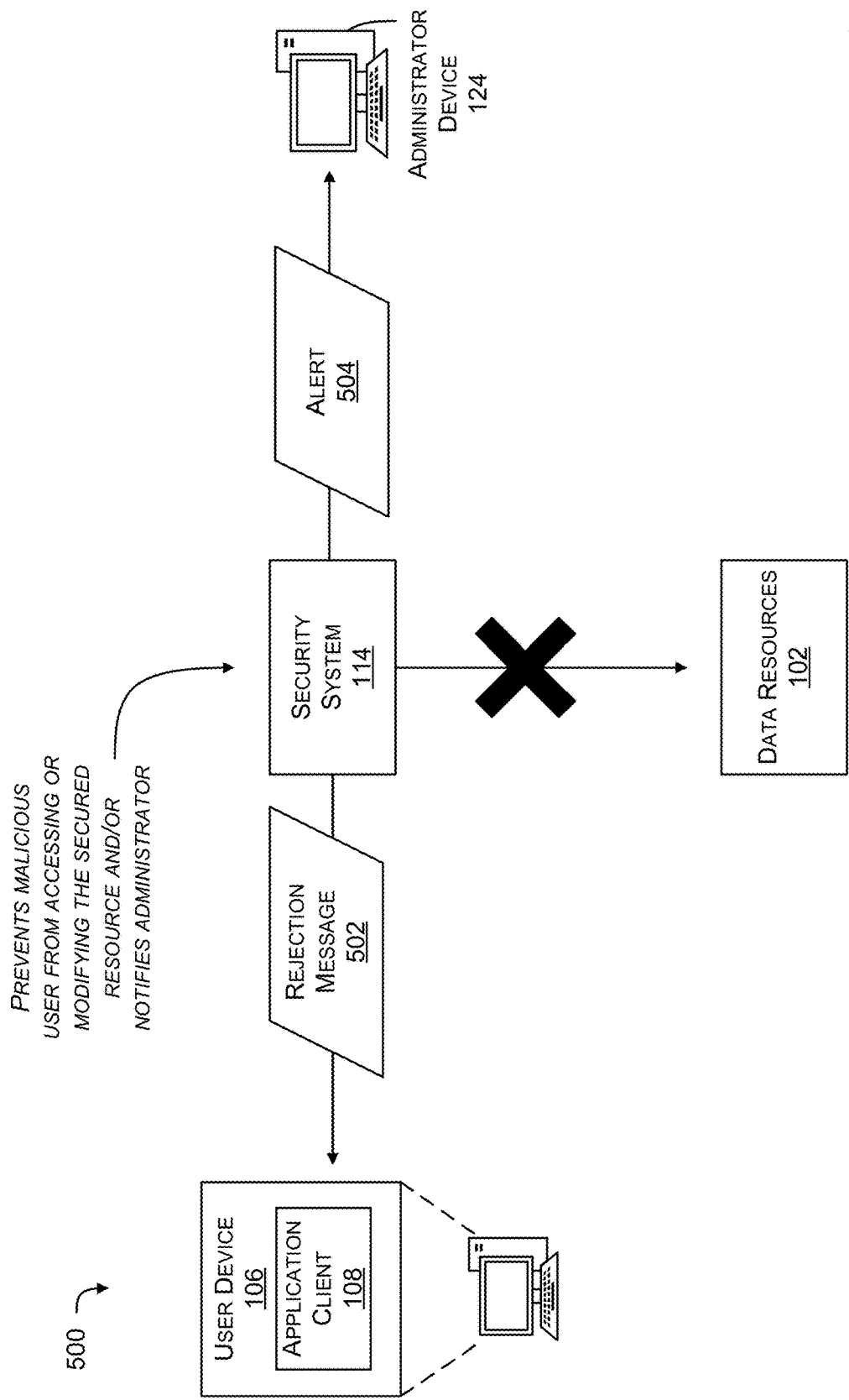
FIG. 5 illustrates example signaling for taking protective actions upon determining that a user has a malicious intent.

FIG. 5 illustrates example signaling 500 for taking protective actions upon determining that a user has a malicious intent. As illustrated in FIG. 5, the signaling is between the data resources 102, user device 106, security system 114, and administrator device 124 described above with reference to FIG. 1. The user device 106 may operate the application client 108 described above with reference to FIG. 1.

In various cases, the user device 106 and/or application client 108 may have previously provided a request to access the data resources 102. However, the security system 114 may determine that a user associated with the user device had requested the data resources 102 with a malicious intent. Accordingly, the security system 114 may block the user device 106 from accessing the data resources 102. In some cases, the data resources 102 include an application service that, along with the application client 108 operating on the user device 106, constitutes a distributed application. By blocking the user device 106 from accessing the data resources 102, the security system 114 may also prevent the user device 106 from using the application.

In some examples, the security system 114 may generate a rejection message 502 indicating that the user device 106 has been rejected from accessing the data resources 102. The security system 114 may provide the rejection message 502 to the user device 106. In some cases, the rejection message 502 is provided to the application client 108. The user device 106 may output the rejection message 502 to the user.

According to some implementations, the security system 114 may generate an alert 504. The alert 504, for example, indicates an identity of the user requesting the data resources 102, an identity of the user device 106, an indication of the data resources 102 being requested, a time at which the data resources 102 were requested, or any combination thereof. The security system may output the alert 504 to the administrator device 124. In various cases, the administrator device 124 outputs the alert 504 to an administrator.

Figure 6:
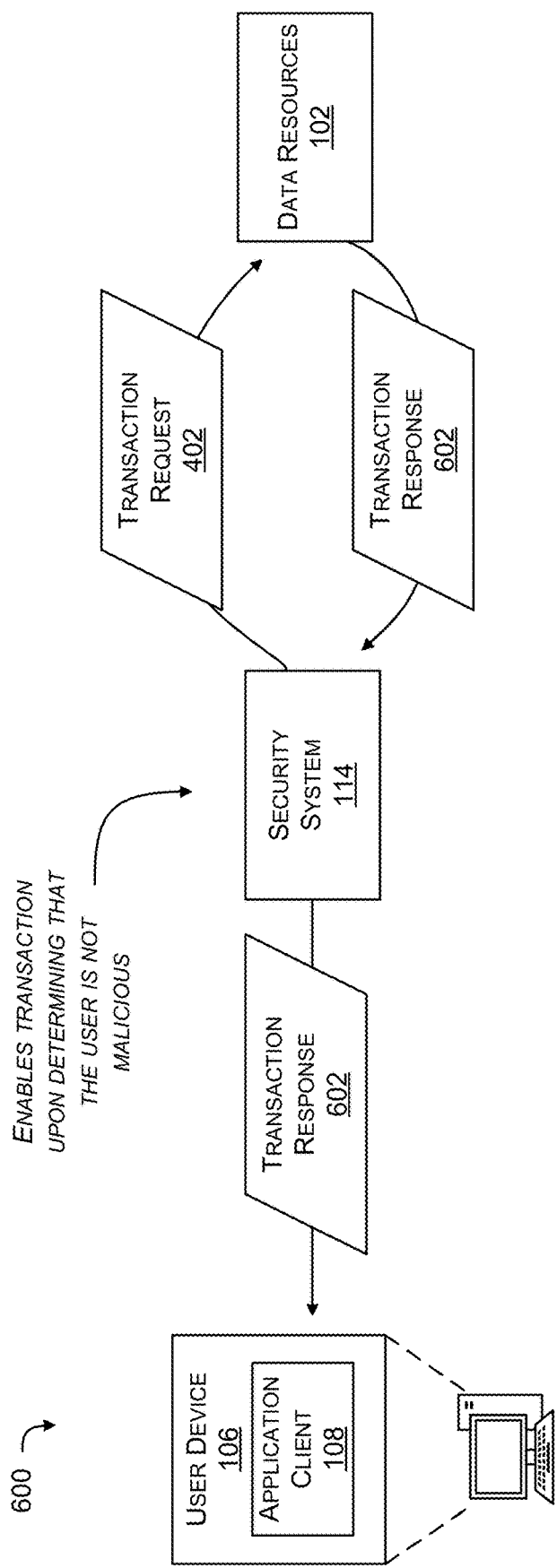
FIG. 6 illustrates example signaling for permitting access to data resources if a requesting user is found to not have malicious intent.

FIG. 6 illustrates example signaling 600 for permitting access to data resources 102 if a requesting user is found to not have malicious intent. As shown, the signaling 600 is between the data resources 102, the user device 106, and the security system 114 described above with reference to FIG. 1. The user device 106 may operate the application client 108 described above with reference to FIG. 1.

Upon determining that the intent of the user requesting access to the data resources 102 is not malicious, the security system 114 may forward the transaction request 402 to the data resources 102. In turn, the data resources 102 may return a transaction response 602. Although FIG. 6 illustrates the transaction response 602 being transferred through the security system 114, implementations are not so limited. For example, user device 106 may receive the transaction response 602 directly from the data resources 102. In some cases, the transaction response 602 is provide to the application client 108 operating on the user device 106.

In some implementations, the transaction response 602 includes at least a portion of the data resources 102. For example, the transaction request 402 may include a request to read and/or store data in the data resources 102 and the transaction response 602 may include the requested data. In particular cases, the transaction response 602 includes a confirmation that data in the data resources 102 has been modified or otherwise utilized. For example, the transaction request 402 may include a call to an application service in the data resources 102 and the transaction response 602 may include data indicating the result of that call. In some cases, the transaction request 402 may include a request to delete, add to, or otherwise modify data in the data resources 102. The transaction response 602 may indicated that the data was deleted, added to, or otherwise modified.

Figure 7:
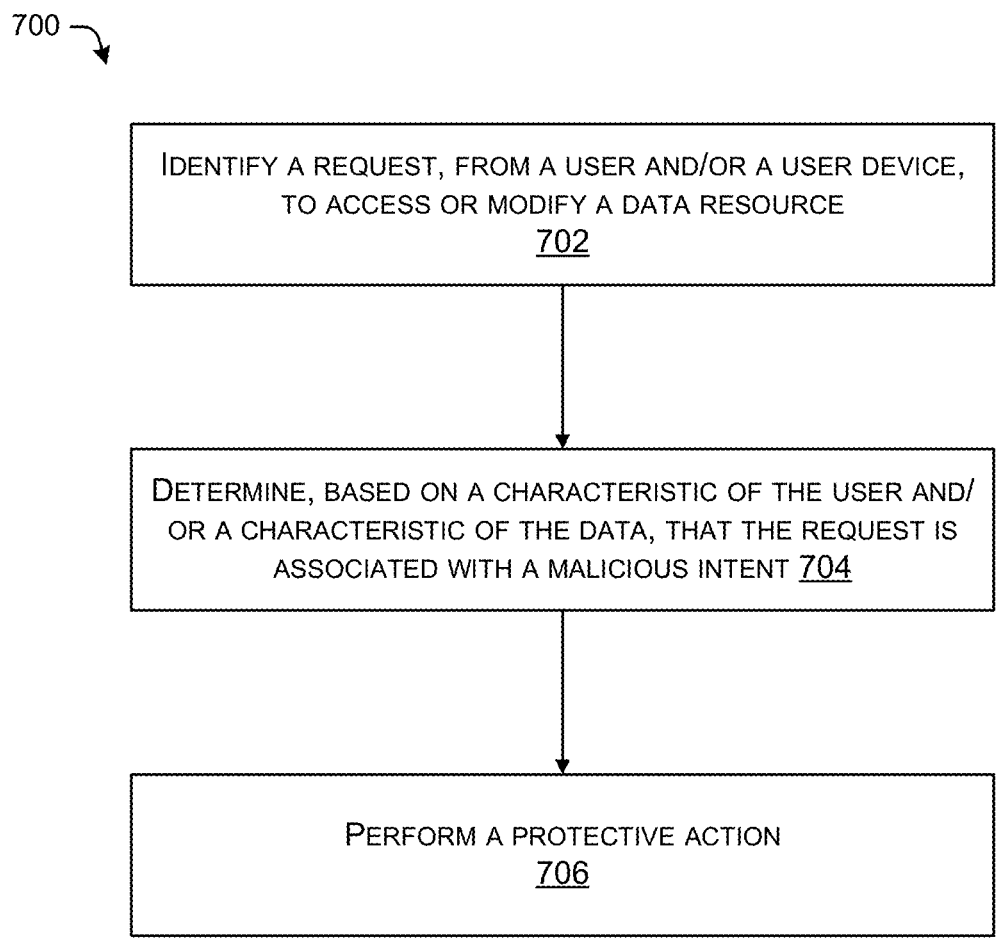
FIG. 7 illustrates an example process for handling a request for a data resource associated with malicious intent.

FIG. 7 illustrates an example process 700 for handling a request for a data resource associated with malicious intent. The process 700 can be performed by an entity, which may include the security system 114 described above with reference to FIG. 1.

At 702, the entity identifies a request, from a user and/or a user device, to access or modify a data resource. The data resource may include data stored in a datastore (e.g., a database). In some implementations, the data resource may include an application service operating on a device that is remote from the user device. According to some implementations, the request may be to download and/or store data stored in a device that is remote from the user device.

At 704, the entity determines, based on a characteristic of the user and/or a characteristic of the data, that the request is associated with a malicious intent. The entity may apply one or more anomaly detection techniques described herein. In some cases, the characteristic of the user includes whether behavior of the user is anomalous. The entity may determine that the request is anomalous with respect to previous behavior of the user and/or with respect to the behavior of other individuals in a same organization as the user. For instance, the entity may determine that the request is anomalous with respect to other individuals that share substantially the same role (e.g., the same job title, part of the same business unit, etc.) as the user. The entity may determine that the request is associated with a malicious intent upon determining that the behavior of the user is malicious.

In various implementations, the characteristic of the user includes whether the user is departing the organization. For example, the request is more likely to be malicious if the user is about to leave the organization, due to resigning from the organization, being fired from the organization, or being laid off from the organization. In some cases, the characteristic includes whether the user has been subjected to discipline within the organization. In various implementations, the entity determines that a departure date of the user is within a threshold time period (e.g., one hour, one day, one week, two weeks, one month, etc.). The entity may infer that the request is associated with a malicious intent upon determining that the user is departing the organization (e.g., within the threshold time period).

In some cases, the characteristic of the user includes whether a behavior of the user has triggered a security event. For example, the behavior may include a previous transaction (e.g., an attempt to access and/or modify data) engaged by the user. The security event may include a blocking action taken by a firewall, for instance.

According to some examples, the characteristic of the data includes whether the data includes sensitive data. For example, if the data includes confidential data or high-value data, the request is more likely to be associated with malicious intent. In some implementations, the entity may infer that the request is associated with a malicious intent upon determining that the data includes sensitive data.

In various implementations, the entity may calculate a metric indicative of a likelihood that the request is associated with a malicious intent. The metric may be based on the characteristic of the user and/or the characteristic of the data. In some cases, the entity may compare the metric to a threshold, and may conclude that the request is associated with a malicious intent if the metric exceeds the threshold.

At 706, the entity performs a protective action. In various implementations, the entity may prevent the user from accessing or modifying the data resource. The entity may block the user from accessing or otherwise utilizing an application that is at least partially operating on the user device. According to some cases, the entity may transmit an alert to an administrator device. The alert may indicate the user, the user device, the data resource, or any combination thereof.

Figure 8:
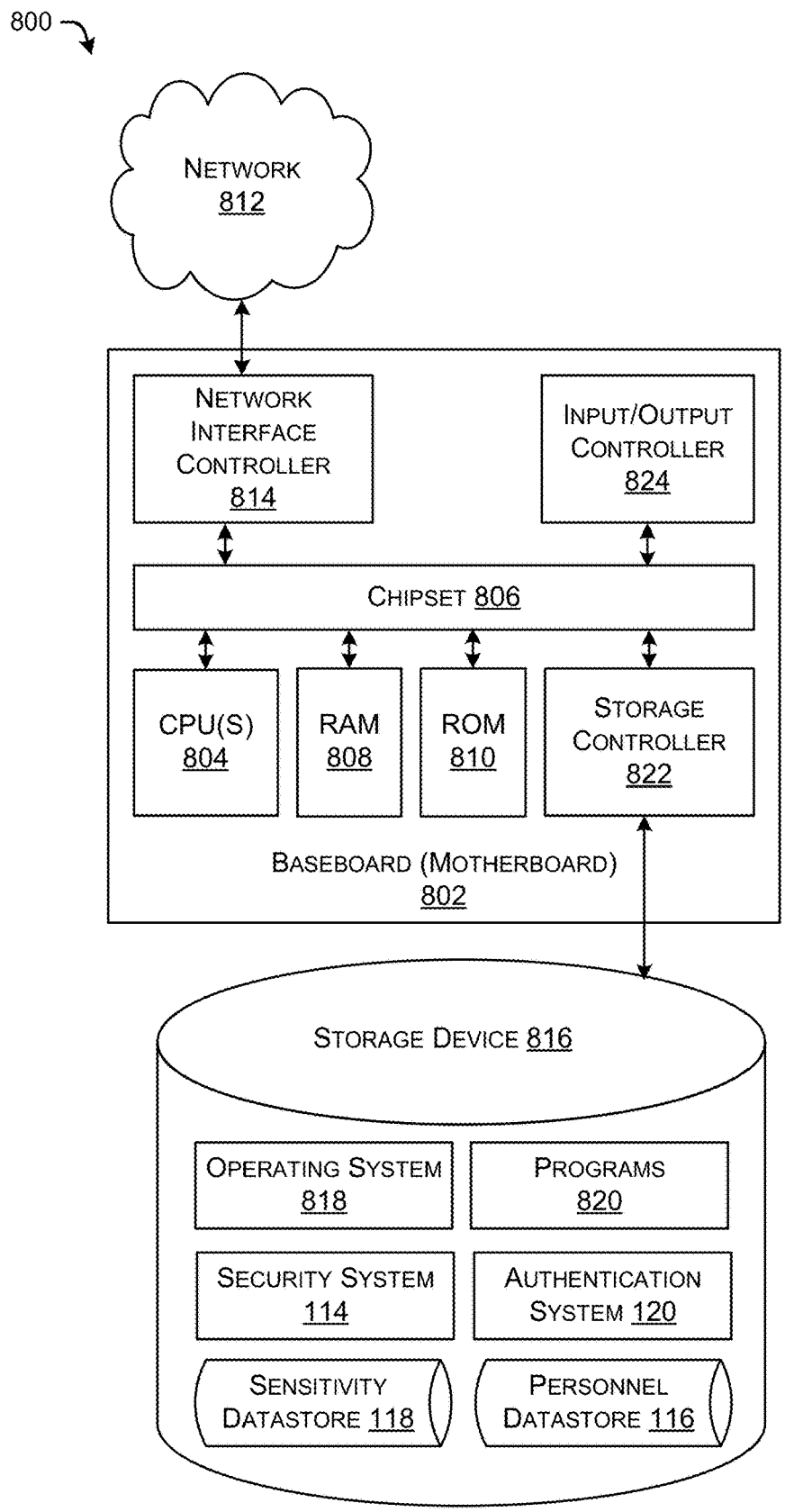
FIG. 8 shows an example computer architecture for a server computer capable of executing program components for implementing any of the functionality described herein.

FIG. 8 shows an example computer architecture for a server computer 800 capable of executing program components for implementing the functionality described above. The computer architecture shown in FIG. 8 illustrates a conventional server computer, workstation, desktop computer, laptop, tablet, network appliance, e-reader, smartphone, or other computing device, and can be utilized to execute any of the software components presented herein.

The computer 800 includes a baseboard 802, or "motherboard," which is a printed circuit board to which a multitude of components or devices can be connected by way of a system bus or other electrical communication paths. In one illustrative configuration, one or more central processing units ("CPUs") 804 operate in conjunction with a chipset 806. The CPUs 804 can be standard programmable processors that perform arithmetic and logical operations necessary for the operation of the computer 800.

The CPUs 804 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 806 provides an interface between the CPUs 804 and the remainder of the components and devices on the baseboard 802. The chipset 806 can provide an interface to a random-access memory (RAM) 808, used as the main memory in the computer 800. The chipset 806 can further provide an interface to a computer-readable storage medium such as a read-only memory (ROM) 810 or non-volatile RAM (NVRAM) for storing basic routines that help to startup the computer 800 and to transfer information between the various components and devices. The ROM 810 or NVRAM can also store other software components necessary for the operation of the computer 800 in accordance with the configurations described herein.

The computer 800 can operate in a networked environment using logical connections to remote computing devices and computer systems through a network 812. The chipset 806 can include functionality for providing network connectivity through a network interface controller (NIC) 814, such as a gigabit Ethernet adapter. The NIC 814 is capable of connecting the computer 800 to other computing devices over the network 812. It should be appreciated that multiple NICs 814 can be present in the computer 800, connecting the computer 800 to other types of networks and remote computer systems. In some instances, the NICs 814 may include at least on ingress port and/or at least one egress port.

The computer 800 can be connected to a storage device 816 that provides non-volatile storage for the computer. The storage device 816 can store an operating system 818, programs 820, and data, which have been described in greater detail herein. Further, the storage device 816 may store data and/or instructions for performing functions of the security system 114, the personnel datastore 116, the sensitivity datastore 118, the authentication system 120, or any combination thereof. The storage device 816 can be connected to the computer 800 through a storage controller 822 connected to the chipset 806. The storage device 816 can consist of one or more physical storage units. The storage controller 822 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 800 can store data on the storage device 816 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 816 is characterized as primary or secondary storage, and the like.

For example, the computer 800 can store information to the storage device 816 by issuing instructions through the storage controller 822 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 800 can further read information from the storage device 816 by detecting the physical states or characteristics of one or more particular locations within the physical storage units.

In addition to the mass storage device 816 described above, the computer 800 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 800.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 816 can store an operating system 818 utilized to control the operation of the computer 800. According to one embodiment, the operating system comprises the LINUX™ operating system. According to another embodiment, the operating system includes the WINDOWS™ SERVER operating system from MICROSOFT Corporation of Redmond, Wash. According to further embodiments, the operating system can comprise the UNIX™ operating system or one of its variants. It should be appreciated that other operating systems can also be utilized. The storage device 816 can store other system or application programs and data utilized by the computer 800.

In one embodiment, the storage device 816 or other computer-readable storage media is encoded with computer-executable instructions which, when loaded into the computer 800, transform the computer from a general-purpose computing system into a special-purpose computer capable of implementing the embodiments described herein. These computer-executable instructions transform the computer 800 by specifying how the CPUs 804 transition between states, as described above. According to one embodiment, the computer 800 has access to computer-readable storage media storing computer-executable instructions which, when executed by the computer 800, perform the various processes described above with regard to FIGS. 1-7. The computer 800 can also include computer-readable storage media having instructions stored thereupon for performing any of the other computer-implemented operations described herein.

As illustrated in FIG. 8, the storage device 816 stores programs 820, which may include one or more processes. The process(es) may include instructions that, when executed by the CPU(s) 804, cause the computer 800 and/or the CPU(s) 804 to perform one or more operations.

The computer 800 can also include one or more input/output controllers 824 for receiving and processing input from a number of input devices, such as a keyboard, a mouse, a touchpad, a touch screen, an electronic stylus, or other type of input device. Similarly, an input/output controller 824 can provide output to a display, such as a computer monitor, a flat-panel display, a digital projector, a printer, or other type of output device. It will be appreciated that the computer 800 might not include all of the components shown in FIG. 8, can include other components that are not explicitly shown in FIG. 8, or might utilize an architecture completely different than that shown in FIG. 8.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
   identifying a request, made by a user, to access or modify a data resource controlled by an organization and associated with an application runtime;
   authenticating the user;
   identifying a role of the user in the organization;
   identifying behavior of other users in the organization sharing the role of the user, wherein the behavior at least partially includes one or more transactions associated with the other users;
   subsequent to authenticating the user, determining that the request is an anomalous request with respect to the behavior of the other users based at least in part on the anomalous request including a transaction associated with the application runtime that is different from the one or more transactions associated with the other users;
   subsequent to determining that the request is the anomalous request, determining runtime application self-protection (RASP) data, the RASP data indicating application performance behavior associated with the anomalous request and the application runtime;
   determining that a time at which the anomalous request was made by the user is within a threshold time period of a time at which the user is departing the organization;
   determining, based on the time being within the threshold time period and the application performance behavior indicated by the RASP data, that the anomalous request is associated with a malicious intent; and
   based on determining that the anomalous request is associated with the malicious intent, blocking the user from accessing or modifying the data resource.

2. The method of claim 1, wherein authenticating the user comprises:
   receiving, from a primary device associated with the user, at least one first authentication factor;
   receiving, from the primary device or a secondary device associated with the user, at least one second authentication factor; and
   determining that the at least one first authentication factor and the at least one second authentication factor match predetermined authentication factors associated with an authorized user.

3. The method of claim 1, further comprising:
   determining that the request is an anomalous request with respect to previous behavior of the user, and
   wherein the previous behavior of the user comprises the user accessing a previous data resource, the user modifying the previous data resource, a web service call of an application utilized by the user, or a line of code of the application called during utilization by the user.

4. The method of claim 1, wherein determining that the anomalous request is associated with the malicious intent further comprises:
   determining that a previous transaction of the user triggered a security event comprising a firewall blocking data traffic to or from a device of the user.

5. The method of claim 1, further comprising:
   based on determining that the anomalous request is associated with the malicious intent:
   blocking the user from operating an application; or
   transmitting, to an administrator device, an alert indicating the user is attempting to modify or access the data resource.

6. The method of claim 1, wherein the threshold time period is one week or less, and
   wherein determining that the anomalous request is associated with the malicious intent further comprises determining that the user is departing the organization unwillingly.

7. The method of claim 1, the user being a first user, the request being a first request, the data resource being a first data resource, the RASP data being first RASP data, and the application performance behavior being first application performance behavior, the method further comprising:
   identifying a second request, made by a second user, to access or modify a second data resource controlled by the organization and associated with the application runtime;
   authenticating the second user;
   subsequent to authenticating the second user, determining a comparison between the second request and the one or more transactions associated with the other users;
   determining, based at least in part on the comparison, that the second request is a second anomalous request with respect to the behavior of other users, wherein the second anomalous request at least partially includes a transaction associated with the application runtime that is different from the one or more transactions of the other users;
   subsequent to determining that the second request is the second anomalous request, determining second RASP data, the second RASP data indicating second application performance behavior associated with the second anomalous request and the application runtime;
   determining a data type of the transaction associated with the application runtime, the data type not comprising sensitive data;
   determining, based on the data type not comprising sensitive data and the second application performance behavior, that the second request is not associated with a malicious intent; and
   based on determining that the second request is not associated with the malicious intent, allowing the second user to access or modify the second data resource.

8. The method of claim 1, wherein the request to access or modify the data resource comprises triggering execution of one or more lines of code.

9. A system, comprising:
   at least one processor; and
   memory storing instructions that, when executed by the at least one processor, cause the system to perform operations comprising:

identifying a request, made by a user, to access or modify a data resource controlled by an organization and associated with an application runtime;

identifying a role of the user in the organization;

identifying behavior of other users in the organization that share the role of the user, wherein the behavior at least partially includes one or more transactions associated with the other users;

authenticating the user;

subsequent to authenticating the user, determining that the request is an anomalous request with respect to the behavior of the other users based at least in part on the anomalous request including a transaction associated with the application runtime that is different from the one or more transactions associated with the other users and comprising sensitive data;

subsequent to determining that the request is the anomalous request, determining runtime application self-protection (RASP) data, the RASP data indicating application performance behavior associated with the anomalous request and the application runtime;

determining that a time at which the anomalous request was made by the user is within a threshold time period of a time at which the user is departing from the organization;

determining, based on the time being within the threshold time period and the application performance behavior indicated by the RASP data, that the anomalous request is associated with a malicious intent; and based on determining that the anomalous request is associated with the malicious intent, performing a protective action.

10. The system of claim 9, wherein authenticating the user comprises:

receiving, from a primary device associated with the user, at least one first authentication factor;

receiving, from the primary device or a secondary device associated with the user, at least one second authentication factor; and determining that the at least one first authentication factor and the at least one second authentication factor match predetermined authentication factors associated with an authorized user.

11. The system of claim 9, wherein determining that the anomalous request is associated with the malicious intent further comprises:

determining that the request is an anomalous request with respect to previous behavior of the user, and wherein the previous behavior of the user comprises at least one of the user accessing a previous data resource, the user modifying the previous data resource, a web service call of an application utilized by the user, or a line of code of the application called during utilization by the user.

12. The system of claim 9, wherein the sensitive data comprises at least one of confidential information or information with a high business value.

13. The system of claim 9, wherein determining that the anomalous request is associated with the malicious intent further comprises:

determining that a previous transaction of the user triggered a runtime security event.

14. The system of claim 9, wherein performing the protective action comprises preventing the user from accessing or modifying the data resource.

15. The system of claim 9, wherein performing the protective action comprises blocking the user from operating an application.

16. The system of claim 9, wherein the system comprises an application performance monitoring (APM) system configured to analyze performance of applications based on user behavior.

17. The system of claim 9, wherein determining the RASP data comprises performing a RASP analysis based on user behavior within applications.

18. A system, comprising:

at least one processor; and memory storing instructions that, when executed by the at least one processor, cause the system to perform operations comprising:

receiving, from a user device, a request to access or modify a data resource and associated with an application runtime;

authenticating a user of the user device, the user being a member of an organization;

subsequent to authenticating the user, determining that the request is an anomalous request with respect to:

previous behavior associated with the user device; and behavior associated with other user devices associated with other members of the organization that share a role of the user;

subsequent to determining that the request is the anomalous request, determining runtime application self-protection (RASP) data, the RASP data indicating application performance behavior associated with the anomalous request and the application runtime;

determining that a time at which the anomalous request is received by the system is within a threshold time period at which the user is departing the organization;

determining, based on the time being within the threshold time period and the application performance behavior indicated by the RASP data, that the anomalous request is associated with malicious intent; and based on determining that the anomalous request is associated with the malicious intent, performing at least one protective action.

19. The system of claim 18, the user device being a first user device, wherein authenticating the user comprises:

receiving, from the first user device, at least one first authentication factor;

receiving, from the first user device or a second user device associated with the user, at least one second authentication factor; and determining that the at least one first authentication factor and the at least one second authentication factor match predetermined authentication factors associated with an authorized user.

20. The system of claim 18, wherein performing the at least one protective action comprises:

preventing the user device from accessing or modifying the data resource; and transmitting, to an administrator device, an alert indicating at least one of the user, the user device, or the data resource.

* * * * *